United States Patent
Feistel et al.

(10) Patent No.: US 9,234,479 B2
(45) Date of Patent: Jan. 12, 2016

(54) OIL SCRAPER RING

(75) Inventors: Norbert Feistel, Ellikon a.d. Thur (CH); Andreas Allenspach, Winterthur (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 13/980,743

(22) PCT Filed: Jan. 23, 2012

(86) PCT No.: PCT/EP2012/050992
§ 371 (c)(1),
(2), (4) Date: Jul. 19, 2013

(87) PCT Pub. No.: WO2012/098266
PCT Pub. Date: Jul. 26, 2012

(65) Prior Publication Data
US 2013/0291824 A1    Nov. 7, 2013

(30) Foreign Application Priority Data
Jan. 21, 2011    (EP) ..................................... 11151750

(51) Int. Cl.
*F16J 15/32*    (2006.01)
*F02F 5/00*    (2006.01)
(Continued)

(52) U.S. Cl.
CPC . *F02F 5/00* (2013.01); *F16J 9/062* (2013.01); *F16J 9/203* (2013.01); *F16J 15/26* (2013.01);
(Continued)

(58) Field of Classification Search
CPC ..... F16J 15/32; F16J 15/3208; F16J 15/3212; F16J 15/26; F16J 15/28; F16J 15/3272; F02F 5/00
USPC .......................... 277/308, 309, 311, 510, 540
See application file for complete search history.

(56) References Cited

U.S. PATENT DOCUMENTS 117,927 A * 8/1871 Richards ........................ 277/510
644,696 A * 3/1900 Swain ............................ 277/510
(Continued)

FOREIGN PATENT DOCUMENTS

DE    196 30 745    2/1998
EP    1 446 597    8/2004
(Continued)

OTHER PUBLICATIONS

International Search Report for International Application No. PCT/EP2012/050992 mailed May 9, 2012.
(Continued)

*Primary Examiner* — Lindsay Low
*Assistant Examiner* — Jacob Amick
(74) *Attorney, Agent, or Firm* — Pearl Cohen Zedek Latzer Baratz LLP (57) ABSTRACT

The oil control ring (1) comprises a retaining ring (2) and a scraper (3) having a scraper fin (3a), wherein the scraper (3) is arranged in the retaining ring (2) in such a way that the scraper fin (3a) is oriented towards the center (1a) of the oil control ring (1) in order to scrape oil on a piston rod (6). The scraper (3) comprises a plurality of scraper segments (3e) which are arranged in succession in the circumferential direction (1b) of the oil control ring (1), and the retaining ring (2) has a groove (2b) for accommodating the scraper segments (3a) in a positive manner, and the retaining ring (2) has an abutment point (2g). The retaining ring (2) forms at least one plastic first end face (2d, 2e) which is oriented towards the center (1a) of the oil control ring (1). The scraper (3) is made of a harder material than the plastic forming the first end face (2d, 2e), the scraping fin (3a) of the scraper (3) has a contact point (3c) oriented towards the center (1a) and the scraper (3) and the retaining ring (2) are adapted to each other in such a way that both the at least one first end face (2d, 2e) and the contact point (3c) can lie against the piston rod (6).

12 Claims, 8 Drawing Sheets (51) Int. Cl.
*F16J 9/06* (2006.01)
*F16J 9/20* (2006.01)
*F16J 15/26* (2006.01)

(52) U.S. Cl.
CPC .............. *F16J 15/32* (2013.01); *F16J 15/3208* (2013.01); *F16J 15/3212* (2013.01); *F16J 15/3272* (2013.01)

(56) References Cited

U.S. PATENT DOCUMENTS

| | | | |
|---|---|---|---|
| 2,435,943 A * | 2/1948 | Nehls | 277/576 |
| 3,305,241 A | 2/1967 | Hart | |
| 4,067,584 A | 1/1978 | Hunger | |
| 4,184,690 A * | 1/1980 | Brown | 277/515 |
| 5,474,307 A | 12/1995 | DeBiasse | |
| 6,193,236 B1 | 2/2001 | Helpap | |
| 6,267,380 B1 | 7/2001 | Feistel | |
| 6,322,080 B1 | 11/2001 | Feistel | |
| 2004/0227301 A1 | 11/2004 | Wood et al. | |
| 2010/0059937 A1 * | 3/2010 | Castleman et al. | 277/309 |

FOREIGN PATENT DOCUMENTS

| | | |
|---|---|---|
| JP | 4-506857 | 11/1992 |
| JP | 10-148262 | 6/1998 |
| WO | WO 91/14890 | 10/1991 |
| WO | WO 95/23305 | 8/1995 |
| WO | WO 97/00396 | 1/1997 |
| WO | WO 03/044400 | 5/2003 |

OTHER PUBLICATIONS

"Polymer Inserts—Provisional design components for poly sys piston Rod scraper & seal system Design principles support holder cast or moulded to suit engine type—projected two lip scraper/seal—triple lip projection", Original Concept Marine Sealing Services, XX, XX, Mar. 7, 2001, pp. 1-8.

* cited by examiner

OIL SCRAPER RING

CROSS-REFERENCE TO RELATED APPLICATIONS

This application is a National Phase Application of PCT International Application No. PCT/EP2012/050992, International Filing Date Jan. 23, 2012, claiming priority of European Patent Application No. 11151750.4, filed Jan. 21, 2011, which is hereby incorporated by reference.

The invention relates to an oil scraper ring.

BACKGROUND OF THE INVENTION

The document EP 1 446 597 B1 discloses an oil scraper ring which can, in particular be used as an oil barrier for piston rods of ship diesel engines. The oil scraper ring has oil scraper lips composed of plastic oriented towards the piston rod side which oil scraper lips scrape the oil present at the piston rod and, for example, supply this again to a crank housing. This known oil scraper ring has the disadvantage that the scraping is not very efficient since the scraping edge is not very stable. Furthermore, a relatively large wear is present, so that the oil scraper ring must be maintained relatively frequently. Moreover, it is known, for example from the document WO 95/23305, to provide a metal scraper which contacts at the piston rod. Such an oil scraper ring has the disadvantage that a relatively large wear is present at the piston ring and/or at the scraper.

SUMMARY OF THE INVENTION

It is the object of the invention to form an advantageous oil scraper ring which ensures a reliable oil scraping over a long period of operation.

The object is in particular satisfied by an oil scraper ring comprising a holding ring, as well as comprising a scraper having a scraper lip, wherein the scraper is arranged in the holding ring, such that the scraper lip is oriented towards the center of the oil scraper ring, in order to scrape oil at a piston rod, wherein the scraper is composed of a plurality of scraper segments arranged following one another in the circumferential direction of the oil scraper ring, and wherein the holding ring has a groove for the form-fitted reception of the scraper segments, and wherein the holding ring has an abutment position, and wherein the holding ring has at least one first end face made of plastic oriented towards the center of the oil scraper ring, and wherein the scraper is composed of a material having a larger hardness than the plastic forming the first end face, wherein the scraper lip of the scraper has a contact position oriented towards the center and wherein the scraper and the holding ring are configured mutually adapted such that both the at least first end face and also the contact position can lie at the piston rod.

The oil scraper ring in accordance with the invention has the advantage that this enables a substantial and efficient scraping of the oil present at the piston rod and that the oil scraper ring only has a small wear. The oil scraper ring in accordance with the invention comprises a scraper which has a larger hardness than the material of the holding ring which forms the first end face and which is determined for abutment at the piston rod. Such a scraper has a stable and, preferably also sharp, scraping edge which ensures an efficient scraping of the oil. Moreover, the oil scraper ring in accordance with the invention comprises a holding ring which has a first end face formed of plastic which is oriented towards the piston rod and which is determined for the contact at the piston rod. The oil scraper ring in accordance with the invention is configured such that both the first end face and also the scraping edge can simultaneously lie at the piston rod which has the consequence that the scraping edge only contacts at the piston rod with very little pressure or even no pressure, since a part of the, in particular radially inwardly acting forces, are transferred via the first end face. The scraping edge thereby experiences a very small wear. Moreover, the position and orientation of the scraping edge is stabilized with respect to the piston rod, by the end face of the holding ring lying at the piston rod, and, in particular is stabilized also with respect to any arising movement. In a particularly advantageous embodiment the material forming the first end face is a plastic with very good dry running properties, such as a filled PTFE or a high temperature polymer modified with filling materials suitable for dry running, such as PTFE, MoS2, graphite etc. The scraper preferably is composed of a metal, such as grey cast, bronze and aluminum or of a plastic, in particular of a high temperature polymer such as PEEK, polyimide or PPS.

The scraper is composed of a plurality of scraper segments. The holding ring can be of one piece design or can be formed from a plurality of holding ring segments. The holding ring as well as the scraper ring are preferably designed and mutually adapted such that the lips of the scraper rings at least partly abut the holding ring, such that the lip is protected from an excessive load, since a force engaging at the scraper ring or respectively at the lip is directly transferred to the holding ring.

The oil scraper ring in accordance with the invention is, in particular particularly suitable for dry running compressors, since for a dry running compressor the contamination of the gas to be compressed by means of lubricant should safely be avoided. Moreover, already small oil leaks which penetrate into a dry running piston rod sealing system bring about its fast destruction. The reliable function of the oil scraper system is particularly important on the compression of oxygen. In this example, oil leaks can even lead to a fire. However, also when no acute danger from oil leaks is present, this at least leads to increased costs of operation, as well as to an environmental load, since the lubricant lost on the crank operation has to be continuously replaced and the leaking oil must be discarded.

The oil scraper ring in accordance with the invention is preferably used in an oil scraper ring package comprising a plurality of oil scraper rings arranged behind one another in the direction of extent of a piston rod.

The invention will be described in the following with reference to embodiments in detail.

BRIEF DESCRIPTION OF THE DRAWINGS

The drawings used for explaining the embodiments show.

Generally like parts are referred to using the same reference numerals in the drawings.

DETAILED DESCRIPTION OF THE PREFERRED EMBODIMENTS

Figure 1:
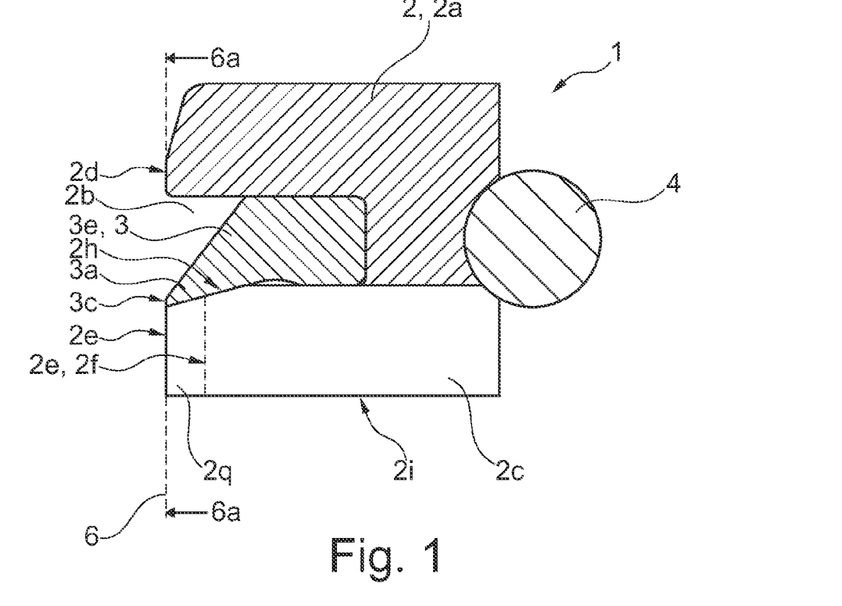
FIG. 1 a cross-section through the oil scraper ring along the sectional line C-C.
Figure 2:
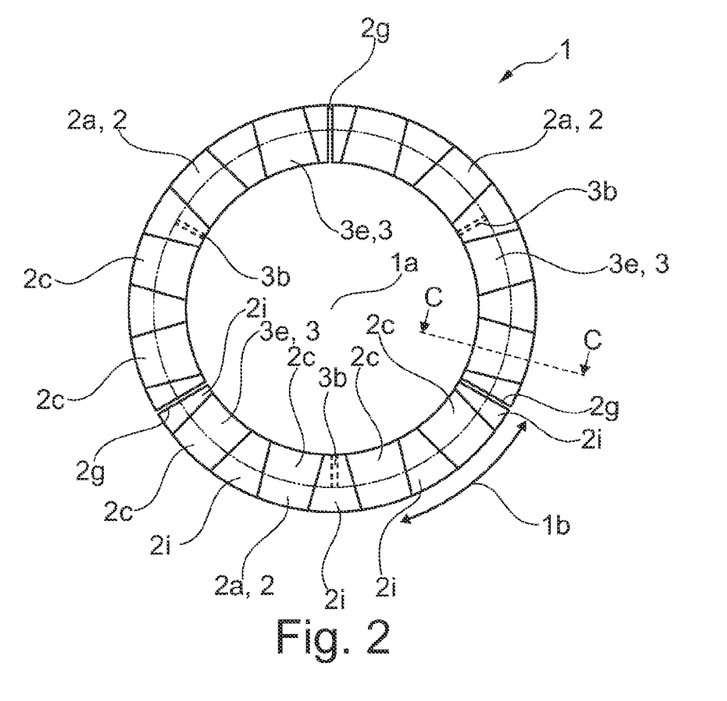
FIG. 2 a view from below on the oil scraper ring in accordance with FIG. 1.

FIG. 1 shows an oil scraper ring 1 along the sectional line C-C illustrated in FIG. 2. FIG. 2 shows the same oil scraper ring 1 in a view from below. As can be seen from FIG. 2 the oil scraper ring comprises a holding ring 2 composed of three holding ring segments 2a arranged behind one another in the circumferential direction 1b, with a respective radially running abutment position 2g being present between the holding ring segments 2a. The holding ring 2 can also only be composed of two holding ring segments 2a or also of more than three holding ring segments 2a. The holding ring 2 has crown parts 2i arranged spaced apart in the circumferential direction 1b between which crown parts a passage 2c respectively extending in a radial direction with respect to the center 1a of the oil scraper ring 1 is arranged. A scraper 3 is arranged in the holding ring 2 which scraper, in the illustrated embodiment, is composed of three scraper ring segments 3e arranged behind one another in the circumferential direction, wherein a respectively radially extending abutment part 3b is present between the scraper ring segments 3e. The scraper 3 can also only be composed of two scraper segments 3e or also of more than three scraper segments 3e. In the assembled state the holding ring 2, moreover, as illustrated in FIG. 1, comprises a clamping element 4 such as a spring, which encloses the holding ring 2 from the outside, and brings about a bias acting against the center 1a onto the holding ring 2 or the scraper 3 respectively.

FIG. 1 shows the holding ring 2 and/or a holding ring segment 2a which has a surrounding groove 2b in which the scraper 3 respectively the scraper ring segment 3e is arranged. The scraper 3 has a scraper lip 3a which has a contact position 3c at its tip. The scraper 3 is preferably composed of a metal, such as grey cast, bronze, brass and aluminum or of a high temperature polymer such as PEEK, polyimide or PPS. The scraper 3 is composed of a material having a larger hardness than the plastic of the holding ring 2 forming the first end face 2d, 2e. The scraper 3 is arranged in the holding ring 2 such that the scraper lip 3a, as well as the contact position 3c are oriented towards the center 1a of the oil scraper ring 1 in order to scrape oil from a surface 6a of a piston rod 6, only hinted at in the illustration. The groove 2b of the holding ring 2 is advantageously configured adapted with respect to the scraper segment 3a such that the groove permits a form-fitted reception of the scraper segment 3a. The holding ring 2 comprises at least one end face 2d, 2e of plastic oriented towards the center 1a of the scraper ring 1. The scraper 3 and the holding ring 2 are configured mutually adapted such that both the at least first end face 2d and also the contact position 3c simultaneously contact the piston rod 6. In an advantageous embodiment the holding ring 2 comprises a first and a second end face 2d, 2e which both project the same distance in the direction towards the center 1a of the oil scraper ring 1, so that both end faces 2d, 2e can lie at the surface 6a of the piston ring 6. In a particularly advantageous embodiment the material forming the first end face 2d is a material with very good dry running properties, such as a filled PTFE or a high temperature polymer modified with filling materials suitable for the dry running, such as PTFE, MoS2, graphite etc. The first and second end face 2d, 2e are mutually separated via a groove 2b extending in the circumferential direction 1b. FIG. 1 moreover shows a passage 2c running in a radial direction which passage is laterally bounded by the crown part 2i.

In a further embodiment the second end face 2e, as illustrated in FIG. 1 in a dotted manner and also referred to with 2f, can be arranged set back so that an intermediate space 2q is formed between the second end face 2e and the surface 6a.

Figure 3:
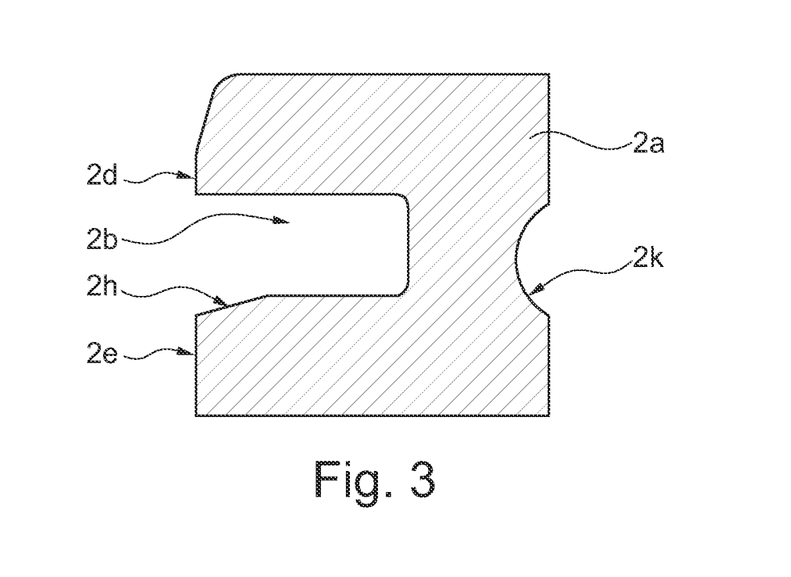
FIG. 3 a cross-section through a holding ring segment along the sectional line D-D.

FIG. 3 shows the holding ring segment 2a with its groove 2b as well as the first and second end faces 2d, 2e again in detail. The holding ring segment 2a further has a recess 2k for the reception of the clamping element 4. The groove 2b has an extent towards the center 1a, in the illustrated embodiment, in which extent the groove 2b has a support surface 2h running transverse or oblique to the surface 6a of the piston rod 6 which support surface, as illustrated in FIG. 1, is arranged and configured such that this serves as a support for the scraper 3.

Figure 4:
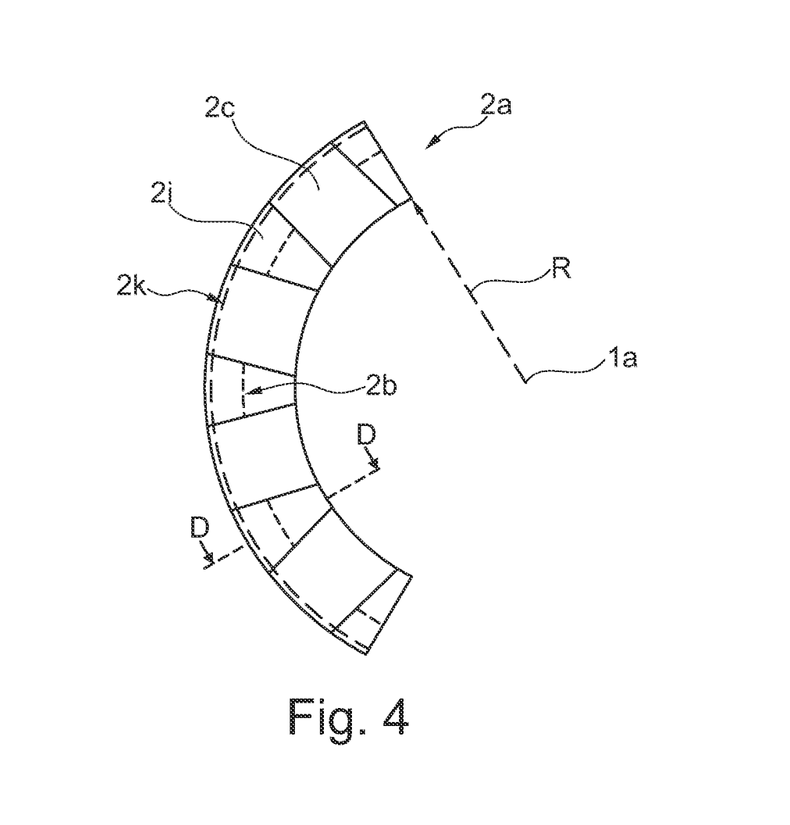
FIG. 4 a top view onto the holding ring segment.

FIG. 4 shows a holding ring segment 2a already illustrated in detail in FIG. 2. The holding ring segment 2a has an inner radius R.

Figure 5:
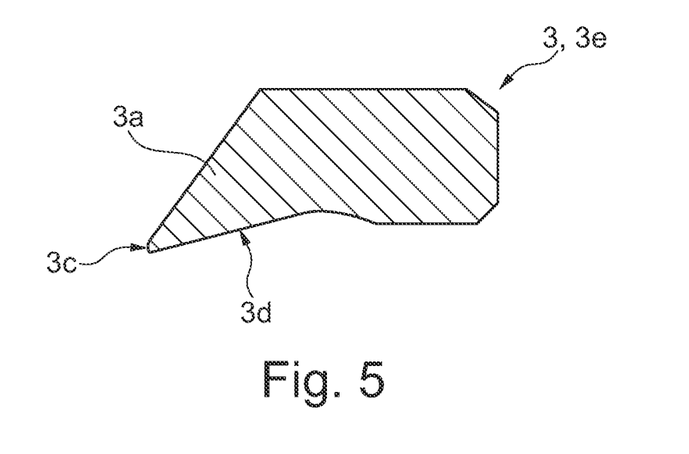
FIG. 5 a cross-section through a scraper along the sectional line C-C.

FIG. 5 shows a section through the scraper ring segment 3e illustrated in Detail in FIG. 1. The scraper ring segment 3e comprises a scraper lip 3a, a support surface 3d, as well as a contact position 3c which is determined for the contact at the piston rod 6. The scraper ring segment 3e preferably is composed of metal so that the contact position 3c is preferably configured as a sharp scraping edge.

Figure 6:
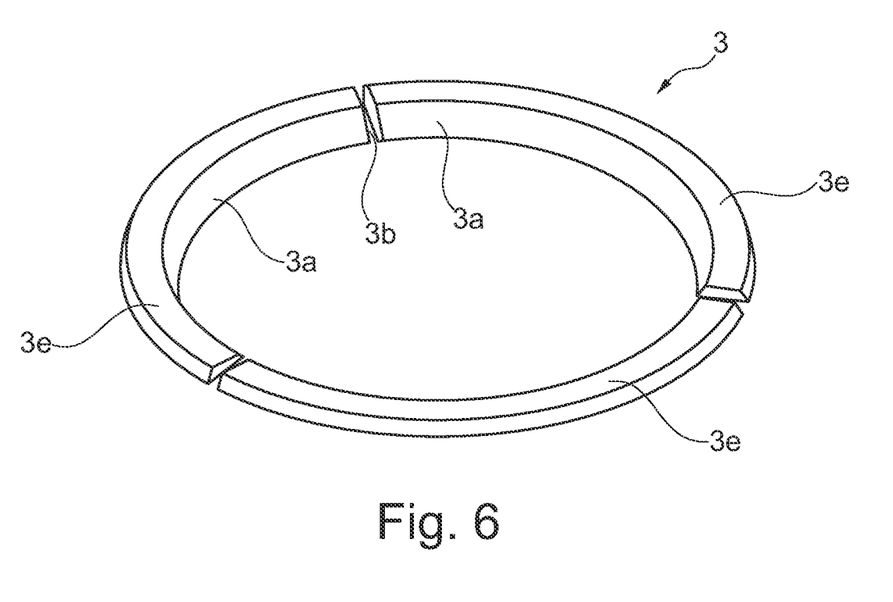
FIG. 6 a perspective view of a scraper.

FIG. 6 shows the scraper 3 already illustrated in FIGS. 1, 2 and 5 in a perspective view. The oil scraper ring 1 in accordance with the invention has the advantage that the contact position 3c of the scraper 3 preferably brings about no or only a small force acting on the surface 6a of the piston rod 6, since forces acting towards the center 1a brought about by the spring 4 can be transferred substantially or completely via the first end face 2d and the possibly present second end face 2e onto the surface 6a of the piston rod 6. The scraper 3 can thus be configured such that this is optimized for an as high as possible scraping effect. In particular the cross-section of the scraper ring or respectively its dimension in radial and/or axial direction can be reduced to a minimum whereupon, also on use of a metal, a good matching of the individual segments to the piston rod 6 results. For maintaining the scraping function with increasing wear, the scraper ring is composed of at least two preferably three segments 3e having an abutment 3b with play dimensioned for the desired wear. The holding ring 2 can be of one piece design or of multi piece design, preferably of three piece design and likewise includes an abutment 2g with play for wear compensation. To avoid oil leakages by the abutments 2g, 3b the holding ring 2 and the scraper 3 are arranged such that they seal one another against the abutments 2g, 3b and thus no continuous leakage paths are present in the running direction of the piston rod 6. In this way a good scraping effect is ensured also on increasing wear.

Figure 12:
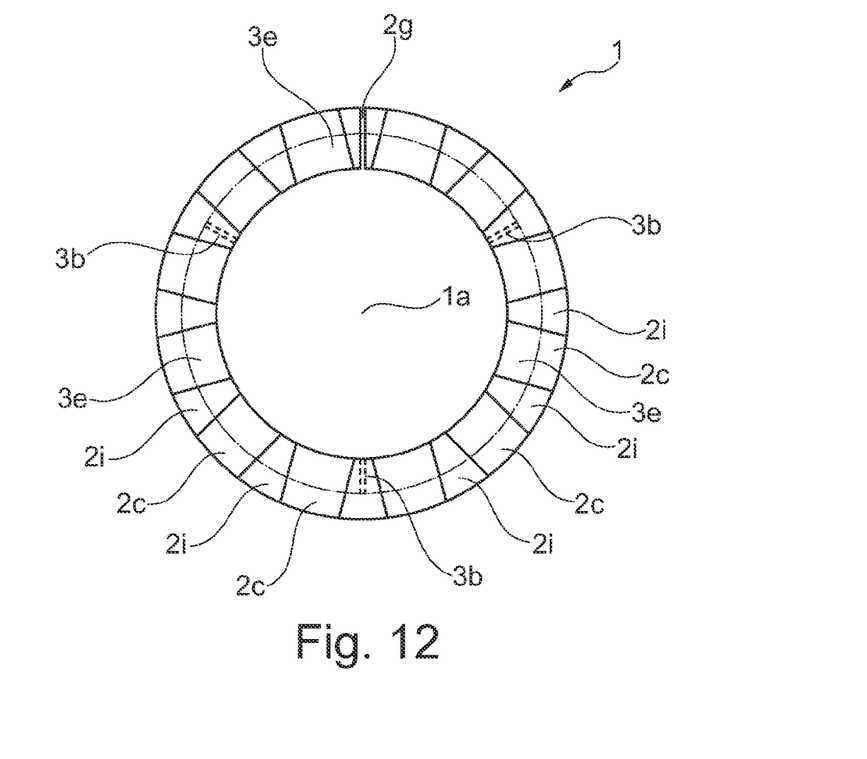
FIG. 12 a top view onto an oil scraper ring of one piece design.

FIG. 12 shows a further embodiment of an oil scraper ring 1 which in contrast to the embodiment illustrated in FIG. 2 has a holding ring 2 of one piece design having a single abutment position 2g. Otherwise, the oil scraper ring 1 is configured as illustrated in FIG. 2 and thus also has the cross-section illustrated in FIG. 1.

Figure 13:
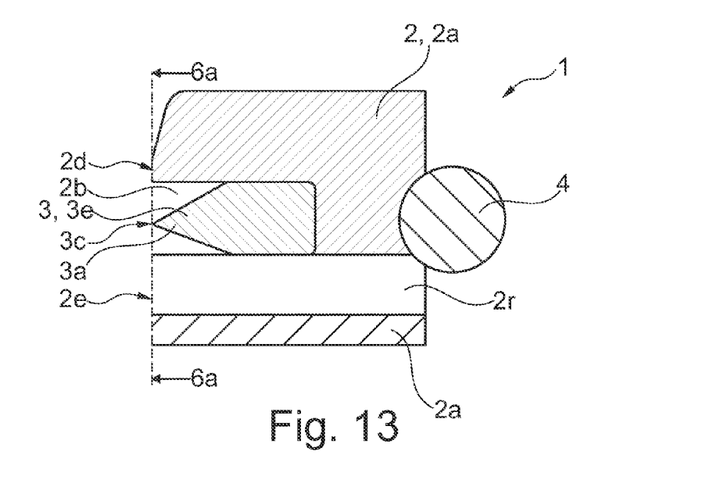
FIG. 13 a cross-section through a further embodiment of an oil scraper ring.

FIG. 13 shows a further embodiment of an oil scraper ring 1 in section which, in contrast to the embodiment illustrated in FIG. 1, has no support surface 2h, since the scraper 3 extends point-like to the center 1a and forms the contact position 3c at its tip. The passage 2c can, as illustrated by way of example in FIG. 13, also be configured as a covered passage 2r so that the covered passage 2r forms a through opening.

Figure 11:
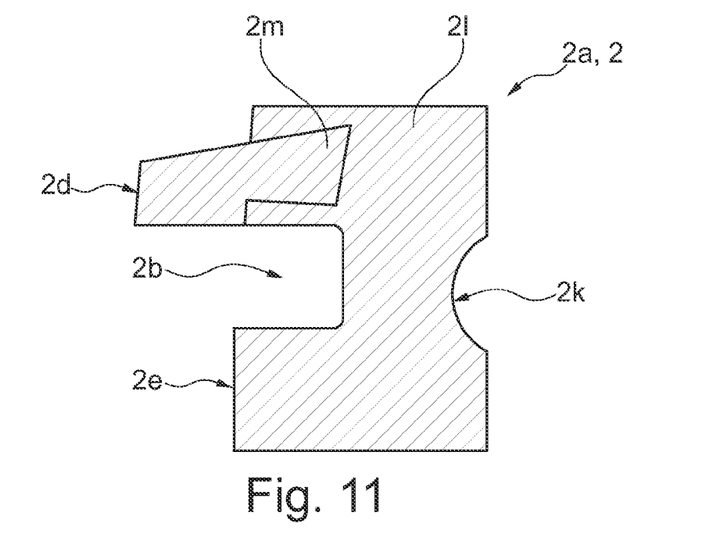
FIG. 11 a cross-section through a further embodiment of an oil scraper ring.

FIG. 11 shows a further embodiment of a holding ring 2 or of a holding ring segment 2a respectively in a section. The holding ring 2 is composed of at least a first ring part 2l and a second ring part 2m, wherein the first and second ring part 2l, 2m are connected to one another, preferably fixedly connected to one another, wherein the second ring part 2m is arranged between the center 1a and the first ring part 2l, and wherein the second ring part 2m is composed of a plastic, and wherein the second ring part 2m forms the end face 2d. The first ring part 2l can be formed of a plastic or of a metal. The second end face is arranged set back with respect to the first end face 2d, such that only the first end face 2d and the non-illustrated contact surface 3c of the non-illustrated scraper 3 contact at the surface 6a of the piston ring 6.

Figure 7:
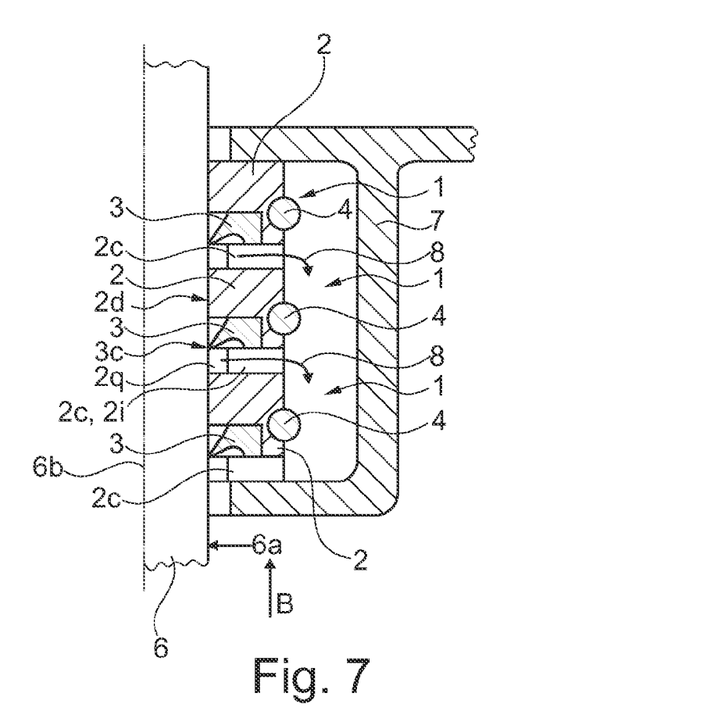
FIG. 7 a vertically arranged package comprising three oil scraper rings arranged behind one another.
Figure 8:
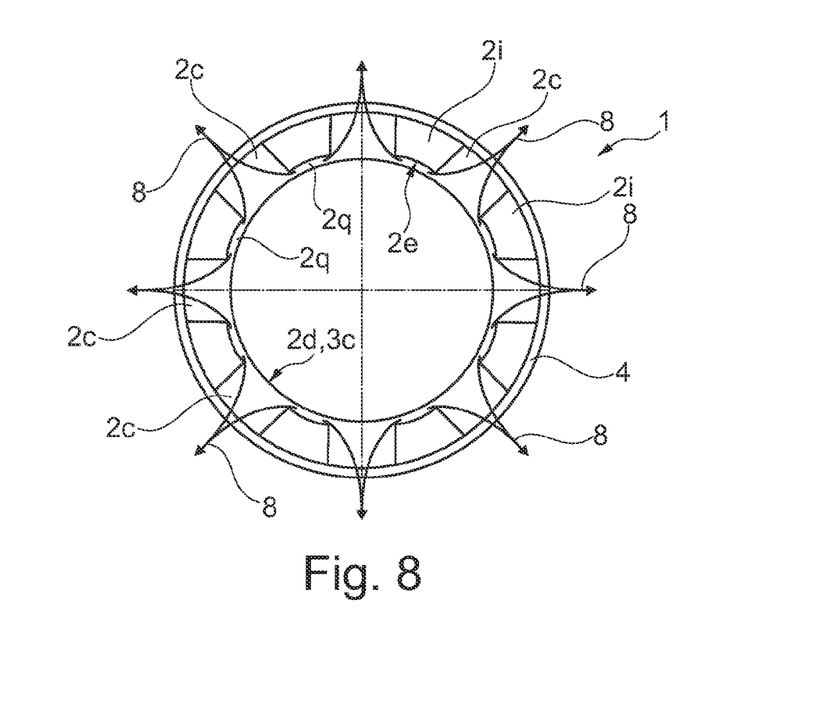
FIG. 8 a front view of the oil scraper ring illustrated in FIG. 7 from direction B.

FIG. 7 shows a vertically running oil scraper ring package comprising three oil scraper rings 1 arranged behind one another in the direction of extent of the piston rod 6. FIG. 8 shows a front view from the direction B of the oil scraper ring 1 arranged in FIG. 7. As illustrated in FIG. 8, the second end face 2e is illustrated by dots like in FIG. 1 and is arranged set back, so that an intermediate space 2q is formed between the crown part 2i and the surface 6a of the piston rod 6. The first end face 2d as well as the contact surface 3c of the scraper 3 lie at the surface 6a of the piston rod 6, so that oil is scraped which, as illustrated by the fluid flow 8, escapes via the passages 2c radially outwardly. FIG. 7 likewise shows how the oil escapes via the fluid flow 8 and flows downwardly within the housing 7. The oil scraper ring 1 illustrated in FIG. 8 has a plurality of crown parts 2i arranged regularly spaced apart in the circumferential direction, wherein passages 2c arranged regularly spaced apart from one another in the circumferential direction are formed between the crown parts 2i.

Figure 9:
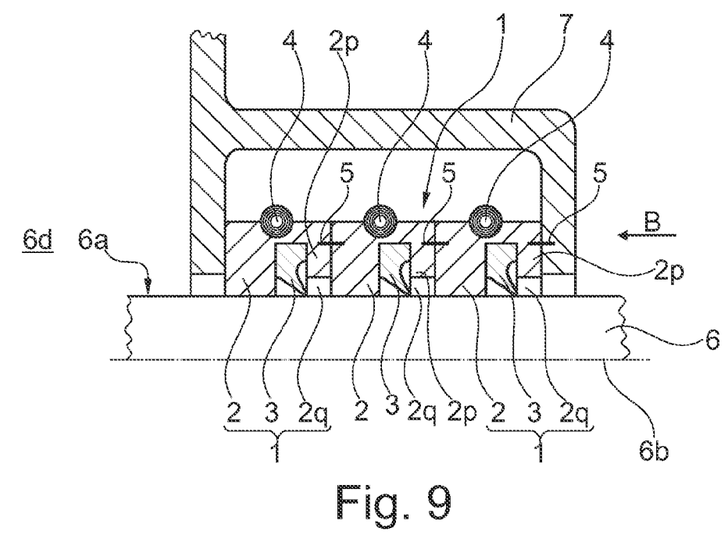
FIG. 9 a horizontally arranged package comprising three oil scraper rings arranged behind one another.
Figure 10:
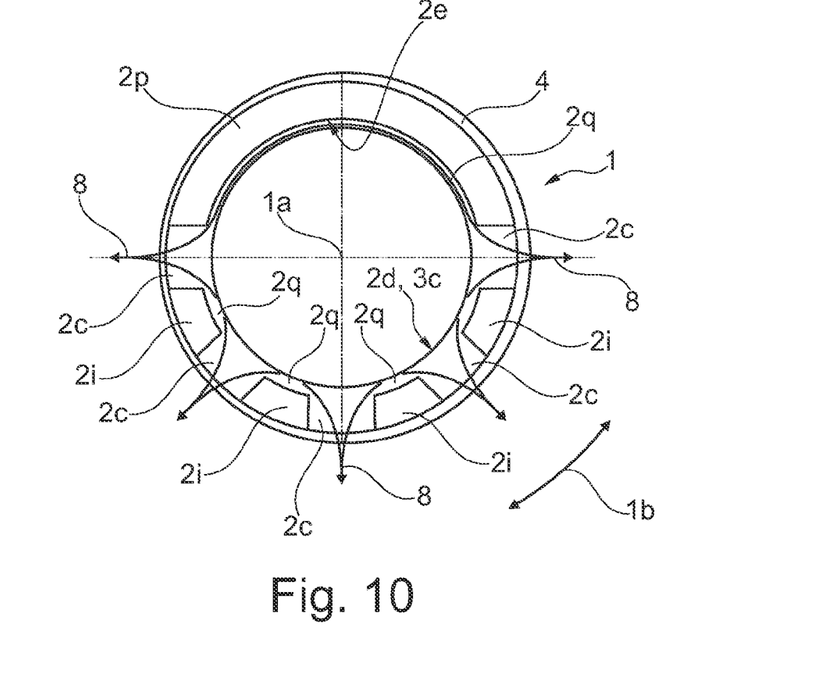
FIG. 10 a front view of an oil scraper ring illustrated in FIG. 9 from direction B.

FIG. 9 shows a horizontally running oil scraper ring package comprising three oil scraper rings 1 arranged following one another in the direction of extent of the piston rod 6. FIG. 10 shows a front view from the direction B of an oil scraper ring 1 arranged in FIG. 9. As illustrated in FIG. 10 the second end face 2e is arranged set back, as illustrated in FIG. 1 in a dotted manner, such that an intermediate space 2q is formed between the crown part 2i and the surface 6a of the piston rod 6. The first end face 2d as well as the contact surface 3c of the scraper 3 lie at the surface 6a of the piston rod 6, so that oil is scraped which, as illustrated by the fluid flow 8, escapes via the passages 2c radially outwardly. The passages 2c are arranged at the bottom in the circumferential direction at least along an angular range of 60 degrees, wherein a respective crown part 2i is arranged between two passages 2c. Advantageously each passage 2c has a width corresponding to an angular range of at least 10 degrees in the circumferential direction 1b, so that each passage 2c extends over an angular range of at least 10 degrees in the circumferential direction 1b. At the top a substantially semicircular continuous crown part 2p is arranged between the passages 2c arranged between the left and the right, which crown part 2p extends over an angular range of at least 60 degrees, wherein this semicircular crown part 2p is configured continuously in the circumferential direction, such that the crown part 2p has no opening. This design has the advantage that the scraped oil, as illustrated by the fluid flow 8, can only escape downwardly, since the oil scraper ring 1 has no continuous passage 2c towards the top in the radial direction. In a particularly advantageous embodiment the oil scraper rings 1 arranged beside one another, as illustrated in FIG. 9, have a security against rotation, for example, a fixing pin 5, in order to prevent a rotation of the oil scraper ring 1 with respect to one another and in order to preferably also prevent a rotation of the oil scraper ring 1 with respect to the housing 7.

The oil scraper ring 1 in accordance with the invention, as illustrated in FIGS. 9 and 7, has the advantage that the drainage passages formed by the intermediate spaces 2q are not switched downstream but upstream of the scraper 3 from the direction B, so that a continuous planar surface is formed in the circumferential direction towards a compressor piston 6d. This surface acts as a sealing surface and thus prevents the exit of lubricant in the direction of extent of the piston rod 6 from the respective oil scraper ring 1. Furthermore, as illustrated in FIG. 9, advantageously no drainage passages are arranged in the direction opposing the gravity for the use in a horizontal arrangement. The scraped oil is thus, as illustrated in FIG. 10, only guided laterally and downwardly. In this way an overflow of the individual scrapers 3 or of the individual oil scraper rings 1 respectively is prevented. Advantageously, the fixing pins 5 further ensure that the scraper 3 is installed in the correct position with the sealed passages towards the top.

Figure 14:
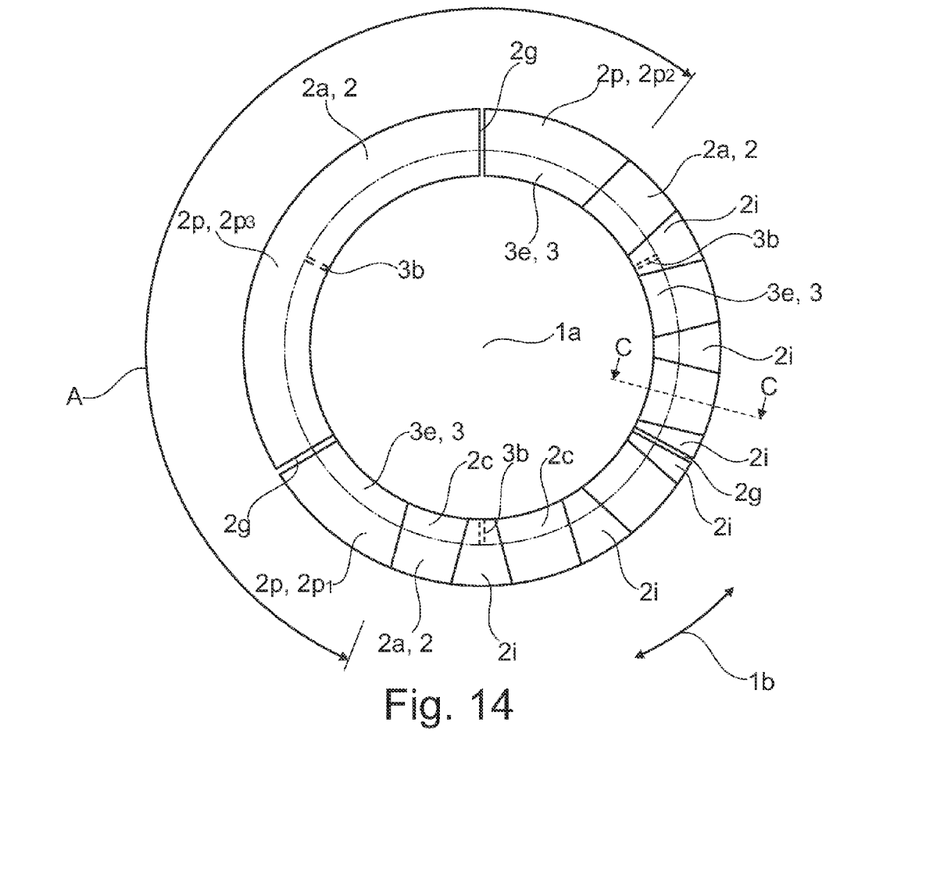
FIG. 14 a view onto a further oil scraper ring.

FIG. 14 shows a top view onto a further embodiment of an oil scraper ring 1. In contrast to the oil scraper ring 1 illustrated in FIG. 2 the oil scraper ring 1 illustrated in FIG. 14 has a continuous crown part 2p extending over an angular range A. The angular range A can extend over an angular range between 60 degrees and 350 degrees. In the illustrated embodiment the complete crown part 2p is composed of three crown parts 2p1, 2p2, 2p3. The complete crown part 2p can, however, also only comprise one single crown part segment 2p3 or only two crown part segments 2p1, 2p2, 2p3 in dependence on the size of the angular range A.

Figure 15:
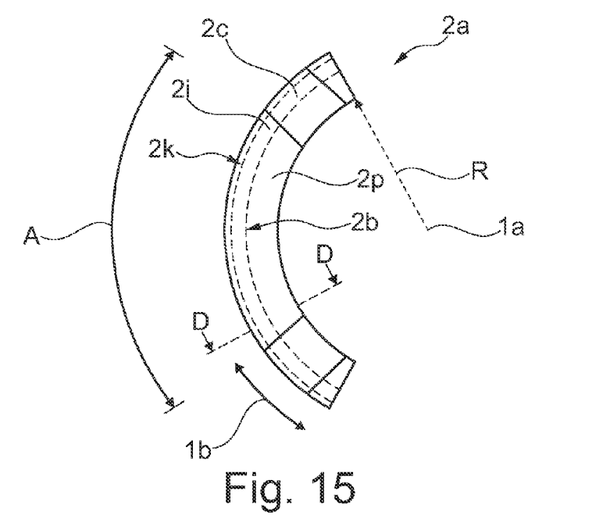
FIG. 15 a top view onto a further holding ring segment.

FIG. 15 shows a top view onto a further embodiment of a holding ring segment 2a. In contrast to the holding ring segment 2a illustrated in FIG. 4, the holding ring segment illustrated in FIG. 15 has a crown part 2i which is configured as a continuous crown part 2p and extends in the circumferential direction 1b over an angular range A of approximately 60 degrees. An oil scraper ring 1 can, for example, comprise two holding ring segments 2a, as illustrated in FIG. 4, as well as a holding ring 2a, as illustrated in FIG. 15, so that the oil scraper ring 1 would comprise a continuous crown part 2p which extends over an angular range A of approximately 60 degrees. The angular range A, can, for a holding ring segment 2a which extends over an angular range of 120 degrees, lie in the range between 0 and 120 degrees.

Figure 16:
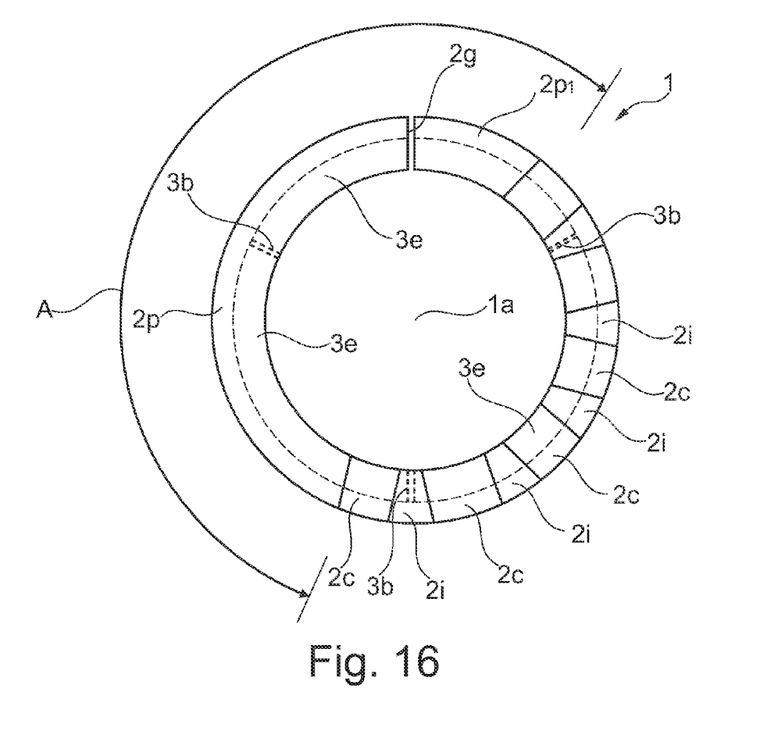
FIG. 16 a top view onto a further oil scraper ring of one piece design.

FIG. 16 shows a top view onto a further embodiment of an oil scraper ring 1 of one piece design. In contrast to the oil scraper ring illustrated in FIG. 12, the oil scraper ring 1 illustrated in FIG. 16 has a continuous crown part 2p which extends over an angular range A which can extend over an angle of between 60 degrees and 350 degrees. In the illustrated embodiment the radially running abutment position 2g extends through the crown part 2p. The abutment part 2g can, however, also be arranged such that this is not arranged in the angular range A and for this reason does not extend through the crown part 2p.

The invention claimed is:

1. An oil scraper ring comprising
a holding ring,
a clamping element, and a scraper having a scraper lip, wherein the scraper is arranged in the holding ring such that the scraper lip is oriented towards a center of the oil scraper ring in order to scrape oil at a piston rod, wherein the scraper is composed of a plurality of scraper segments which abut one another in a circumferential direction of the oil scraper ring, thereby forming a scraper segment butt-joint between consecutive scraper segments;

wherein the holding ring has two end faces, a first end face and a second end face oriented towards the center of the oil scraper ring, the first end face and the second end face being mutually separated by a groove running in the circumferential direction;

wherein the groove is for form-fitted reception of the scraper segments;

wherein the holding ring and the scraper extend in an axial direction;

wherein the holding ring in the axial direction ends on each side at a side face extending radial to the axial direction, so that the side faces extend in parallel to each other, wherein the scraper segments are arranged in the holding ring such that the scraper segments do not protrude from the side faces in the axial direction;

wherein the holding ring is composed of a plurality of holding ring segments which abut one another in the circumferential direction, thereby forming a holding ring segment butt-joint between consecutive holding ring segments;

wherein the holding ring is made of plastic, wherein at least the first end face of the holding ring is adapted to contact the piston rod, wherein the first end face extends in axial direction forming one continuous surface that contacts the piston rod;

wherein the holding ring has an outer surface, oriented opposite to the center of the oil scraper ring;

wherein the clamping element encloses the holding ring from the outer surface to bring a bias acting against the center onto the holding ring and the first end face, to hold the holding ring in an defined position;

wherein the scraper is composed of a material having a larger hardness than the plastic forming the first end face;

wherein the scraper lip of the scraper has a contact position oriented towards the center;

wherein the scraper and the holding ring are configured mutually adapted such that both of the at least one end face and the contact position are configured to simultaneously contact the piston rod;

wherein the holding ring segment butt-joints at the at least one end face and the scraper segment butt-joints at the contact position are arranged spaced apart in axial direction and are arranged spaced apart from each other in circumferential direction so that the at least one end face and the contact position seal the piston rod against leakage in axial direction; and wherein the holding ring has at least one passage running radially with respect to the center, forming a passage between the second end face and the outer surface.

2. An oil scraper ring in accordance with claim 1, wherein the first and the second end faces project the same distance towards the center of the oil scraper ring.

3. An oil scraper ring in accordance with claim 1, wherein the first end face projects further towards the center than the second end face such that an intermediate space is formed between the second end face and a surface of the piston rod.

4. An oil scraper ring in accordance with claim 1, wherein the scraper is composed of three scraper segments, wherein a radially running abutment position is formed between scraper segments arranged adjacent one another in the circumferential direction.

5. An oil scraper ring in accordance with claim 1, wherein a continuous crown part extending in the circumferential direction is arranged adjoining at the at least one passage in the circumferential direction which crown part extends over an angular range between 60 degrees and 350 degrees, wherein the continuous crown part is configured in the circumferential direction such that the continuous crown part has no outlet in the radial direction.

6. An oil scraper ring in accordance with claim 1, wherein the passages extend in the circumferential direction over an angular range of at least 10 degrees, and in that a crown part is arranged between two passages, which crown part extends over an angular range of at least 60 degrees, with the crown part being configured continuous in the circumferential direction such that the crown part has no opening.

7. An oil scraper ring in accordance with claim 1, wherein the groove of the holding ring expands towards the center such that the holding ring has a support surface in the region of the groove running transverse to the piston rod.

8. An oil scraper ring package comprising at least two oil scraper rings in accordance with claim 1.

9. An oil scraper ring package in accordance with claim 8, wherein two oil scraper rings arranged lying next to one another in the direction of extent of the piston rod have a mutual security against rotation.

10. An oil scraper ring package in accordance with claim 9, wherein the security against rotation is configured as a fixation pin.

11. An oil scraper ring in accordance with claim 1, wherein the holding ring has a plurality of passages running radially with respect to the center arranged distributed in the circumferential direction.

12. An oil scraper ring in accordance with claim 1, wherein the scraper segments are composed of metal.

* * * * *